United States Patent Office 3,131,228
Patented Apr. 28, 1964

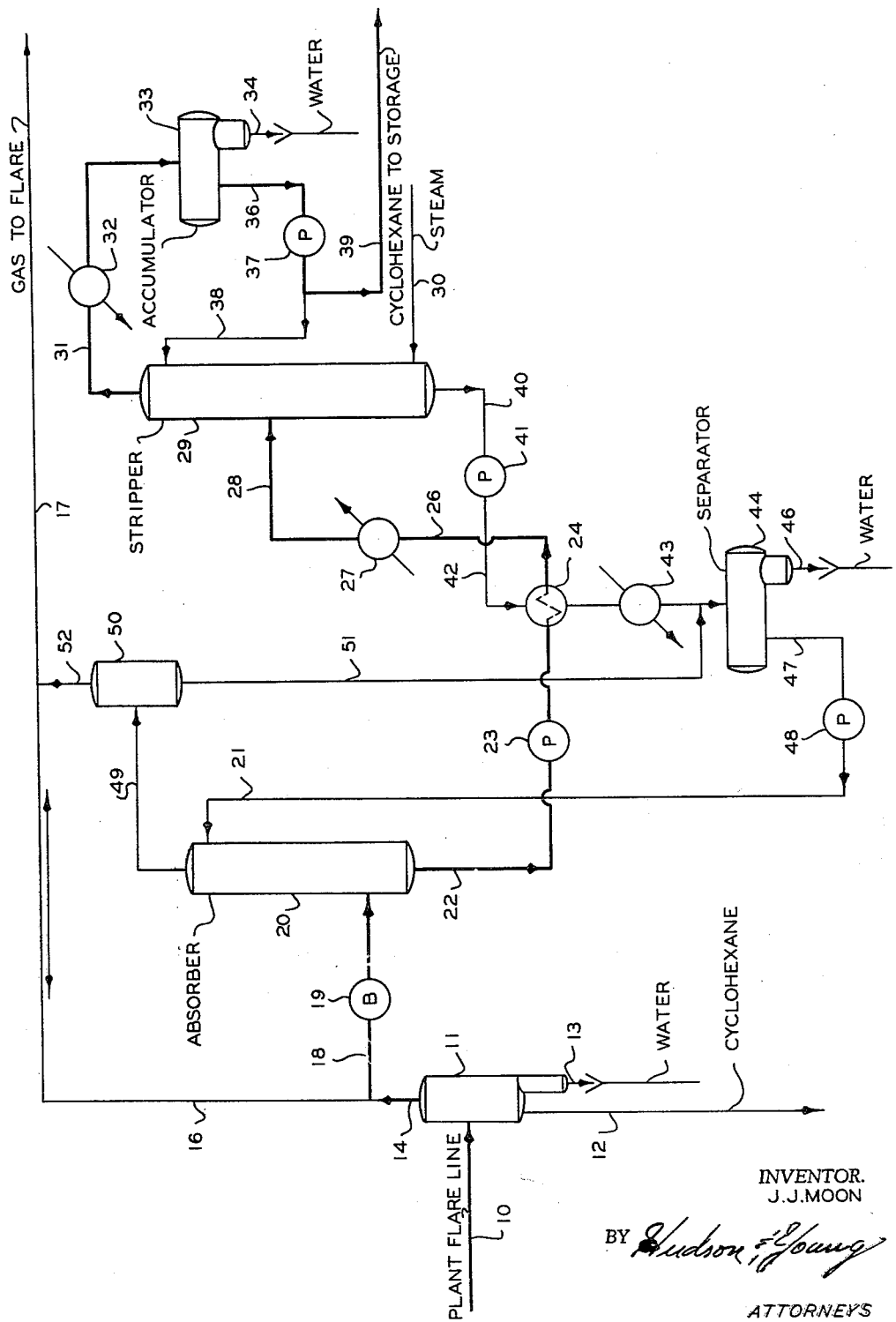

3,131,228
SOLVENT RECOVERY FROM PLANT OFF-GASES
John J. Moon, Bartlesville, Okla., assignor to Phillips Petroleum Company, a corporation of Delaware
Filed Dec. 31, 1962, Ser. No. 249,970
8 Claims. (Cl. 260—666)

This invention relates to a method of recovering process diluent from plant off-gas. In another aspect it relates to a process and apparatus useful in recovering solvent from vented gases accumulated from several pieces of equipment in an olefin polymerization plant. In one of its more specific aspects this invention relates to a method and apparatus for recovering cyclohexane from the off-gas of a commercial scale ethylene polymerization process.

Commercial operations of olefin polymerization and other chemical processes which employ a hydrocarbon process diluent, such as a solvent or liquid carrier for polymer and/or catalyst, have shown that appreciable losses of this hydrocarbon solvent can be expected, particularly during initial operation. Losses occur primarily in vented off-gas streams which are accumulated from the various pressure relief lines connected to process equipment, such as reactors, filters, heat exchangers and the like. Off-gases that are vented in this manner can be saturated or substantially saturated with the process solvent, and in continuous operation of large installations, the amount of such pressure relief off-gas over a period of time can be large enough to involve considerable cost in the loss of solvent. Even so, treatment of off-gases cannot ordinarily be justified economically because of wide variations in the flow of vented gases, and the usual approach is to burn such gases continuously at a remotely located flare.

My invention provides a process and apparatus by which the major portion of process diluent can be recovered from a plant off-gas stream that is subject to large fluctuations in flow. I have found that the necessary equipment to take care of the maximum possible flow through such vent lines cannot be economically justified. The process and apparatus of my invention, however, permit recovery of the major amount of process solvent from the off-gas stream in such a manner that smooth, continuous operation is assured. Major fluctuations in off-gas flow cause very little or no upset in the operation of my solvent recovery system.

According to my invention a hydrocarbon solvent having from 3 to 12 carbon atoms per molecule (such as that customarily employed as a process diluent in olefin polymerization of the type described in the patent to J. P. Hogan et al., U.S. 2,825,721) is recovered from plant off-gas by contacting said gas with an absorption oil, thereby absorbing solvent from said gas, stripping the absorption oil to remove the solvent therefrom, and recirculating the absorption oil to the contacting step. A substantially constant amount of off-gas is passed from the off-gas stream through the absorption zone so that the absorption column is operated under steady conditions and the substantially solvent-free off-gas removed from the absorption zone is returned to the off-gas stream and disposed of in the usual manner, generally by burning at a remotely located flare. The apparatus comprises a main off-gas conduit and an absorption column connected at its bottom and top to said main conduit by first and second conduits, respectively, with a blower in said first conduit to supply the pressure necessary to pass the off-gas through the absorption column. The blower feeding the absorber preferably has a capacity corresponding to the average gas flow through the main conduit. In case of major surges of gas, due to plant upsets, the excess flow is bypassed to the flare. When flow rates in the main conduit are below the blower capacity, the blower draws extra flow from the absorber overhead entering the main conduit through said second conduit.

It is an object of my invention to provide a method of recovering process diluent from the pressure relief off-gas of a chemical processing plant. Another object of my invention is to provide a process and apparatus suitable for the economic recovery of solvent from a polyolefin process off-gas stream. Another object is to provide a method and apparatus by which a solvent can be recovered from a plant off-gas stream that is subject to large fluctuations in flow. Other objects, advantages and features of my invention will be apparent from the following discussion and drawing, which shows schematically one embodiment of the process and apparatus of my invention for recovering solvent from plant off-gas.

Process diluents which can be recovered according to my invention are hydrocarbons having from 3 to 12 and preferably at least 5 carbon atoms per molecule, for example, pentane, isopentane, benzene, toluene, isooctane, cyclohexane, methylcyclohexane, decane, dodecane, and the like. These solvents which include aromatics, paraffins and cycloparaffins are useful as a process diluent or solvent in various processes, such as in the extraction of vegetable oils from soy beans, etc., lube oil dewaxing, the polymerization of butadiene, the hydrogenation of polybutadiene, and particularly in the polymerization of olefins as described in the above-mentioned patent to J. P. Hogan et al. In such a polymerization of ethylene, plant off-gas which generally comprises methane, ethane, ethylene and some air is also generally saturated with water and solvent. Where cyclohexane is the process solvent, the off-gas stream can contain as high as about 50 weight percent cyclohexane.

In commercial plants the total flow of off-gas which is accumulated in various pressure relief headers connected to reactors, filters, heat exchangers, flash tanks and the like can reasonably vary as much as, for example, from about 1,000 to as high as 50,000 standard cubic feet per hour. Extremely high flows of off-gas are normally not of long duration and are generally caused by plant upsets such as a heat exchanger or filter plugging or loss of temperature control in a reactor. Since it would not be practicable to design a solvent recovery system for the maximum flow, it is desirable to use my invention so that a continuous, smooth recovery of solvent is possible even though flow of off-gas changes considerably.

I prefer to employ as an absorption oil in my process a mineral seal oil which has a molecular weight of about 100 to 250, generally boiling in the range of about 400 to 600° F. Somewhat lighter oils can be employed by reducing the temperature of the absorption operation which is normally held at about 80 to 150° F.

To more fully explain my invention reference is made to the drawing which shows a plant flare line 10 feeding into a knockout zone 11 wherein entrained water and solvent (in this illustration cyclohexane) are removed. It is understood that line 10 is connected through several headers to pressure relief lines from various pieces of equipment. It is customary to pass this off-gas to a remote flare for burning as processing this type of plant off-gas for recovery of valuable components thereof has not been generally recognized as economically justifiable prior to my invention. Entrained liquid cyclohexane and water separate by gravity in the lower portion of knockout drum 11 and are removed through conduits 12 and 13, respectively.

The off-gas then passes from knockout drum 11 through line 14, when the stream divides, excess gas passing through lines 16 and 17 to the flare. Off-gas from which solvent is to be recovered is withdrawn from line 14 and is passed through line 18 by blower 19 into absorption column 20. A substantially constant amount of off-gas is moved by blower 19 into the absorption column where it is contacted continuously in countercurrent flow by mineral seal oil entering the column through line 21.

Cyclohexane is absorbed in the mineral seal oil which is withdrawn from the bottom of column 20 through line 22 and is passed by pump 23 through heat exchanger 24. This cyclohexane-rich oil then passes through line 26, heater 27 and line 28 to stripping column 29. In column 29 the mineral seal oil is steam stripped to remove the cyclohexane therefrom. Steam enters the column through line 30 and the vapors of cyclohexane and water leave overhead through line 31. These vapors are condensed in heat exchanger 32 and the condensate is accumulated in vessel 33 where gravity separation between the water and cyclohexane occurs. Water is drawn off through line 34 and cyclohexane is passed through line 36 to pump 37. A portion of the cyclohexane is refluxed to stripping column 29 through line 38 and the remainder is withdrawn as recovered solvent, passing to storage through line 39.

Lean mineral seal oil is withdrawn from stripping column 29 through line 40 and passed by pump 41 through heat exchanger 24 where the oil is cooled by indirect heat exchange with the rich absorption oil from column 20. The lean oil is further cooled in heat exchanger 43 and passes to phase separator 44 which permits any water present in the seal oil to be withdrawn through line 46 and discarded. Lean mineral seal oil is thus passed through line 47 by pump 48 and it is returned through line 21 to absorber column 20.

Off-gas from absorption column 20, having had most of its cyclohexane removed, passes overhead through line 49 into entrainment separator 50 where entrained mineral seal oil is removed and passed to separator 44 through line 51. The off-gas thus processed passes through line 52 and enters conduit 17 through which it can pass on to the flare.

Large flows of off-gas to line 14 which exceed the capacity of blower 19 are bypassed around absorber 20 through line 16 and line 17. Absorber 20 can, therefore, maintain substantially constant operation at a uniform gas flow. If the flow in line 14 decreases to below the constant quantity of gas withdrawn through line 18, off-gas reentering the main conduit through line 52 is returned through line 16 to make up the required amount. By maintaining conduit 16 open so that off-gas can flow in either direction, depending upon the momentary supply in line 14, smooth column operation is assured without the necessity of oversizing the equipment or providing a number of duplicate absorbers.

As an example of the operation of my process, plant off-gas from an ethylene polymerization process is passed through knockout drum 11 at a rate which is generally about 4,550 standard cubic feet per hour or 13,257 pounds per stream day but which varies from 1,000 to 50,000 standard cubic feet per hour at momentary intervals. Under normal conditions the pressure in drum 11 is 0.5 pound per square inch gauge and the temperature is 105° F. Fifteen thousand s.c.f.h. off-gas is passed through blower 19 to absorber 20 which is operated at 125° F. and at a pressure of 1 p.s.i.g. Mineral seal oil at 105° F. is passed at 109,318 pounds per stream day into the top of absorber 20. Rich oil is removed at 115,400 pounds per stream day from the bottom of the absorber and passed to stripping column 29 after being heated to 350° F. in heat exchangers 24 and 27. Cyclohexane is steam stripped in column 29 operating at 15 p.s.i.g. and 328° F. Cyclohexane and water are condensed in condenser 32 and 4 gallons per minute of cyclohexane is refluxed through line 38 while 6089 pounds per stream day of cyclohexane is withdrawn as recovery solvent through line 39. Hot lean oil is withdrawn through line 40 and cooled in exchangers 24 and 43 to 105° F.

Off-gas leaves absorption column 20 through line 49 and enters knockout drum 50 at about 0.5 p.s.i.g. and 105° F. Pressure drop across the absorber is about 0.5 pound per square inch. In the arrangement disclosed blower 19 can feed a constant quantity of off-gas to the absorber. Open conduit 16 connecting lines 52 and 17 with lines 14 and 18 insures that blower 19 is at all times supplied with a constant quantity of off-gas. This is done without check valves, flow regulators or pressure controls which are subject to failure. The simplicity of the system makes the solvent recovery operation very dependable and economically justifiable in many operations where solvent is now being lost.

The above conditions and variables are presented as examples only and should not be construed to limit my invention unduly.

As will be apparent to those skilled in the art, various modifications of my invention can be made without departing from the spirit or scope thereof.

This application is a continuation in part of copending application Serial No. 759,355, filed September 5, 1958, now abandoned.

I claim:

1. In a commercial scale olefin polymerization process employing a hydrocarbon having from 5 to 12 carbon atoms per molecule as a process diluent wherein pressure relief valves vent equipment into a common plant off-gas stream subject to large variations in flow, the method of recovering major quantities of said diluent which comprises directing a substantially constant amount of gas from a first point in said off-gas stream into an absorption zone, contacting said gas in said absorption zone with absorption oil thereby absorbing diluent present in said gas, passing thus contacted gas from said absorption zone to a second point in said stream, passing off-gas supplied to said first point in excess of said constant amount to said second point thereby bypassing said absorption zone with excess off-gas, recycling make-up contacted gas from said second point to said first point when the off-gas supplied to said first point is less than said constant amount thereby providing said constant amount of gas to said absorption zone, passing absorption oil from said absorption zone to a stripping zone, stripping said absorption oil to remove diluent therefrom, recirculating said absorption oil from said stripping zone to said absorption zone, and recovering said diluent removed in said stripping step.

2. A process according to claim 1 wherein said diluent is cyclohexane and said absorption oil is mineral seal oil having a molecular weight of about 100 to 250 and boiling within about 400 to 600° F.

3. In a commercial scale ethylene polymerization process employing cyclohexane as a process diluent wherein pressure relief valves vent equipment into a common plant off-gas stream subject to large fluctuations in flow, the method of recovering a major amount of cyclohexane from said off-gas which comprises passing said stream through an entrainment separation zone to remove entrained liquid cyclohexane therefrom, withdrawing a substantially constant quantity of gas from a first point in said off-gas stream, passing said quantity of gas to an absorption zone, passing off-gas supplied to said first point in excess of said constant quantity to said second point thereby bypassing said absorption zone with said excess off-gas, contacting said quantity of gas with mineral seal oil thereby absorbing cyclohexane present in said quantity of gas, withdrawing mineral seal oil from said absorption zone, stripping said mineral seal oil thus withdrawn to remove cyclohexane therefrom as a vapor, separating water from said mineral seal oil thus stripped, returning said mineral seal oil to said absorption zone, recovering cyclohexane by condensing said vapor and separating water therefrom, withdrawing contacted gas from said absorption zone, separating entrained mineral seal oil from said withdrawn gas, returning said withdrawn gas to said stream at a second point downstream from said first point, and passing gas from said second point to said first point when the off-gas supplied to said first point is less than said constant quantity thereby to make up said quantity of gas withdrawn.

4. A process according to claim 3 wherein said absorption zone is operated at a pressure of about 1 pound per square inch gauge and a temperature of about 80 to 150° F.

5. In an olefin polymerization plant wherein pressure relief valves vent into a common off-gas stream, apparatus for recovering solvent from said off-gas comprising, in combination, a main conduit carrying said off-gas stream and terminating in a vent to the atmosphere, an absorption column, first conduit means connecting a first point in said main conduit with the lower portion of said column, a blower in said first conduit means, second conduit means connecting the upper portion of said column with said main conduit at a second point downstream of said first point, said main conduit being open and unobstructed between said first and second points, and means for passing absorption oil downwardly through said column.

6. Apparatus according to claim 5 comprising an entrainment separator in said main conduit upstream of said first point.

7. Apparatus according to claim 6 comprising an entrainment separator in said second conduit means.

8. Apparatus according to claim 7 comprising a stripping column and conduit means for passing absorption oil from said absorption column to said stripping column and back to said absorption column.

References Cited in the file of this patent

UNITED STATES PATENTS

| | | |
|---|---|---|
| 2,074,644 | Drennan | Mar. 23, 1937 |
| 2,616,829 | Berg | Nov. 4, 1952 |
| 2,825,721 | Hogan et al. | Mar. 4, 1958 |
| 2,913,374 | Van Ackerman et al. | Nov. 17, 1959 |